(12) United States Patent  
Fogelberg et al.

(10) Patent No.: US 12,048,982 B2  
(45) Date of Patent: Jul. 30, 2024

(54) GRINDING HEAD FOR FLOOR GRINDING MACHINE AND METHOD OF ASSEMBLING A GRINDING HEAD, SETTING A BELT TENSIONER, SERVICING, ASSEMBLING OR DISASSEMBLING A BELT PULLEY FOR A FLOOR GRINDING MACHINE

(71) Applicant: HUSQVARNA AB, Huskvarna (SE)

(72) Inventors: Andreas Fogelberg, Söderköping (SE); Daniel Gustavsson, Söderköping (SE); Linus Ottosson, Norsholm (SE); Samuel Adolfsson, Linköping (SE)

(73) Assignee: HUSQVARNA AB, Huskvarna (SE)

( * ) Notice: Subject to any disclaimer, the term of this patent is extended or adjusted under 35 U.S.C. 154(b) by 1177 days.

(21) Appl. No.: 16/305,997

(22) PCT Filed: Jun. 1, 2017

(86) PCT No.: PCT/EP2017/063374  
§ 371 (c)(1),  
(2) Date: Nov. 30, 2018

(87) PCT Pub. No.: WO2017/207722  
PCT Pub. Date: Dec. 7, 2017

(65) Prior Publication Data  
US 2019/0202025 A1     Jul. 4, 2019

(30) Foreign Application Priority Data  
Jun. 3, 2016 (SE) .................................. 1650787-3

(51) Int. Cl.  
B24B 41/047 (2006.01)  
B24B 7/18 (2006.01)  
(Continued)

(52) U.S. Cl.  
CPC ............ B24B 41/047 (2013.01); B24B 7/186 (2013.01); B24B 27/0076 (2013.01);  
(Continued)

(58) Field of Classification Search  
CPC ....... B24B 7/18; B24B 7/186; B24B 27/0076; B24B 41/002; B24B 41/047; B24B 47/10; B24B 47/12; B24B 55/052  
(Continued)

(56) References Cited

U.S. PATENT DOCUMENTS 1,065,600 A    6/1913  Euchenhofer et al.  
1,627,263 A *  5/1927  Baily ................ A47L 11/4044  
                                               451/353  
(Continued)

FOREIGN PATENT DOCUMENTS

CN     202357004 U    8/2012  
CN     202908627 U    5/2013  
(Continued)

OTHER PUBLICATIONS

International Search Report for International Application No. PCT/EP2017/063375, mailed Aug. 9, 2017 (3 pages).  
(Continued)

*Primary Examiner* — Brian D Keller  
*Assistant Examiner* — Marcel T Dion  
(74) *Attorney, Agent, or Firm* — BURR & FORMAN LLP (57) ABSTRACT

The present disclosure relates to a grinding head (1) for a floor grinding machine for grinding floor surfaces of stone or stone-like material. Such a grinding head (1) comprises a lower casing member (3), comprising a lower support (31) and an upwardly extending edge portion (32), and an upper casing member (2), comprising an upper cover (21) and a downwardly extending edge portion (22), wherein the upper  
(Continued)

casing member (2) is joinable to the lower casing member (3) by causing axially distal portions of the edge portions to bear on each other.

15 Claims, 9 Drawing Sheets

(51) Int. Cl.
*B24B 27/00* (2006.01)
*B24B 47/10* (2006.01)
*B24B 47/12* (2006.01)
*F16H 7/08* (2006.01)

(52) U.S. Cl.
CPC .............. *B24B 47/10* (2013.01); *B24B 47/12* (2013.01); *F16H 7/08* (2013.01); *F16H 2007/0842* (2013.01); *F16H 2007/0865* (2013.01)

(58) Field of Classification Search
USPC ......................................... 451/350, 353, 451
See application file for complete search history.

(56) References Cited

U.S. PATENT DOCUMENTS

| | | | |
|---|---|---|---|
| 1,974,136 A | 9/1934 | Emmons | |
| 2,668,968 A * | 2/1954 | Dobrowolski | A47L 11/4038 15/93.1 |
| 2,710,416 A | 6/1955 | Philip | |
| 3,128,581 A * | 4/1964 | Tosetti | A47L 11/4069 15/49.1 |
| 3,169,262 A | 2/1965 | Allen et al. | |
| 3,230,788 A | 1/1966 | Henley | |
| 3,929,038 A | 12/1975 | Moser | |
| 4,328,645 A * | 5/1982 | Sauer | B23Q 11/0046 451/362 |
| 4,731,956 A * | 3/1988 | Wood | A47L 11/4038 15/372 |
| 5,363,600 A * | 11/1994 | Shishido | B24B 55/102 451/358 |
| 5,605,493 A | 2/1997 | Donatelli et al. | |
| 5,885,139 A | 3/1999 | Lemieux et al. | |
| 6,238,277 B1 | 5/2001 | Duncan et al. | |
| 6,331,138 B1 | 12/2001 | Witters et al. | |
| 6,494,772 B1 | 12/2002 | Barnes et al. | |
| 6,540,596 B1 * | 4/2003 | Van Der Veen | B24B 7/186 451/350 |
| 7,022,004 B2 * | 4/2006 | Bohler | B24B 41/047 451/353 |
| 7,241,210 B2 | 7/2007 | Van Vliet | |
| 7,326,106 B1 | 2/2008 | Rogers et al. | |
| 7,393,267 B2 | 7/2008 | Dummermuth-Furter | |
| 7,563,156 B2 * | 7/2009 | Anderson | B24B 7/186 451/353 |
| 8,366,517 B2 | 2/2013 | Weder | |
| 8,485,868 B2 | 7/2013 | Weder | |
| 9,604,341 B2 | 3/2017 | Truong et al. | |
| 2006/0026781 A1 | 2/2006 | Van Vliet | |
| 2007/0042846 A1 * | 2/2007 | Van Vliet | B24B 47/12 474/89 |
| 2007/0184762 A1 * | 8/2007 | Dummermuth-Furter | B24B 7/186 451/353 |
| 2010/0267316 A1 * | 10/2010 | Silver | B24B 41/047 451/353 |
| 2011/0092141 A1 * | 4/2011 | McCutchen | B24B 55/05 451/451 |
| 2011/0099748 A1 | 5/2011 | Barous | |
| 2013/0084782 A1 | 4/2013 | McCutchen et al. | |
| 2014/0273776 A1 | 9/2014 | Leighton et al. | |
| 2015/0328739 A1 * | 11/2015 | Rogers | B24B 7/18 451/353 |
| 2016/0031061 A1 | 2/2016 | Truong et al. | |

FOREIGN PATENT DOCUMENTS

| | | |
|---|---|---|
| CN | 204183347 U | 3/2015 |
| CN | 105150041 A1 | 12/2015 |
| CN | 204976224 U | 1/2016 |
| DE | 202015100403 U1 | 3/2015 |
| EP | 0 700 327 A1 | 3/1996 |
| EP | 1 358 043 A1 | 11/2003 |
| EP | 1806206 A1 | 7/2007 |
| EP | 1942238 A1 | 7/2008 |
| EP | 2329914 A2 | 6/2011 |
| EP | 2329915 A2 | 6/2011 |
| EP | 2561959 A1 | 2/2013 |
| GB | 191501172 A | 7/1915 |
| GB | 321860 A | 11/1929 |
| GB | 2232367 A | 12/1990 |
| KR | 20110004186 U | 4/2011 |
| NL | 1014015 C2 | 7/2001 |
| WO | 0001291 A1 | 1/2000 |
| WO | 03076131 A1 | 9/2003 |
| WO | 2007021191 A2 | 2/2007 |
| WO | 2013106917 A1 | 7/2013 |
| WO | 20130106917 A1 | 7/2013 |
| WO | 2015167376 A1 | 11/2015 |

OTHER PUBLICATIONS

E-Space abstract of CN 202908627.
E-Space abstract of DE 202015100403.
International Search Report for Swedish Application No. 1650788-1, mailed Dec. 30, 2016 (2 pages).
International Search Report for International Application No. PCT/EP2017/063374, mailed Nov. 23, 2017 (5 pages).
International Search Report for Swedish Application No. 1650787-3, mailed Jan. 30, 2017 (2 pages).
International Search Report for International Application No. PCT/EP2017/063373, mailed Mar. 5, 2018 (6 pages).
E-Space abstract of NL 1014015.
E-Space abstract of CN 105150041.
E-Space abstract of CN 202357004.
Ren Fei et al, "Product Design—One Creativity Method", In Book Product Design—Originality & Method, Published on Feb. 29, 2016, pp. 103-104.

* cited by examiner

GRINDING HEAD FOR FLOOR GRINDING MACHINE AND METHOD OF ASSEMBLING A GRINDING HEAD, SETTING A BELT TENSIONER, SERVICING, ASSEMBLING OR DISASSEMBLING A BELT PULLEY FOR A FLOOR GRINDING MACHINE

CROSS-REFERENCE TO RELATED APPLICATIONS

This application claims priority to International Application No. PCT/EP2017/063374, filed Jun. 1, 2017 and titled "GRINDING HEAD FOR FLOOR GRINDING MACHINE AND METHOD OF ASSEMBLING A GRINDING HEAD, SETTING A BELT TENSIONER, SERVICING, ASSEMBLING OR DISASSEMBLING A BELT PULLEY FOR A FLOOR GRINDING MACHINE," which in turn claims priority from a Swedish Application having serial number 1650787-3, filed Jun. 3, 2016 and titled "GRINDING HEAD FOR FLOOR GRINDING MACHINE AND METHOD OF ASSEMBLING A GRINDING HEAD, SETTING A BELT TENSIONER, SERVICING, ASSEMBLING OR DISASSEMBLING A BELT PULLEY FOR A FLOOR GRINDING MACHINE," both of which are incorporated herein by reference in their entireties.

TECHNICAL FIELD

The present disclosure relates to grinding heads for floor grinding machines, and in particular to grinding heads for floor grinding machines adapted for grinding floors of stone or stone-like materials, such as limestone, sandstone, marble, slate, granite, concrete or terrazzo.

BACKGROUND

Floor grinding machines are known and used in polishing or grinding floor surfaces, either with the purpose of producing a level and/or glossy floor surface, or with the purpose of renovating such a surface which has deteriorated due to e.g. wear, or which has been damaged.

A floor grinding machine for this type of grinding typically comprises a machine frame, which carries a motor that is operatively connected to a grinding head.

In a particular class of floor grinding machines, such a grinding head may be rotatable relative to the machine frame. The grinding head may carry a plurality of grinding disks, each of which may be rotatable relative to the grinding head. Such a grinding head is typically referred to as a planetary type grinding head.

These floor grinding machines are usually equipped with grinding elements in the form of bonded abrasives, i.e. abrasives in the form of a three-dimensional body comprising abrasive particles and a matrix material, which may be a polymer material or a metallic material. As another option, the machines may be equipped with cutting elements, adapted, for example for removal of glue, paint, lacquer or other surface treatments from a floor surface.

The machine may typically be supported by its grinding head and often also by a pair of wheels, which may be arranged behind the grinding head, as seen in a forward direction of the machine. Optionally, the machine may also be supported by one or more further wheels, which may be used to control the pressure exerted by the grinding head on the floor.

The pair of wheels may be driven. Optionally, they may be individually drivable, such that a direction of travel of the machine may be controlled.

The grinding head may comprise a lower supporting member and an upper cover member.

The grinding head may comprise a plurality of axles extending between the lower and the upper members. There may be a belt pulley associated with each of the axles. An endless belt may operatively engage some or all of the belt pulleys.

One example of a known machine of this type is disclosed in WO03076131A1. An example of a grinding head for use in such a machine is disclosed in EP0700327A1. Another example of a grinding head is disclosed in EP135804311.

While grinding heads as disclosed in the references mentioned above have found extensive use, there is a desire to provide a grinding head which would simplify the processes of assembling, disassembling, and servicing of the grinding head.

Therefore, there remains a need for an improved grinding head.

SUMMARY

An object of the present disclosure is to provide an improved grinding head for a floor grinding machine for grinding floor surfaces of stone or stone-like materials.

A particular object is to provide a grinding head which is improved in terms of the processes of assembling, disassembling and servicing.

The invention is defined by the appended independent claims, with embodiments being set forth in the appended dependent claims in the following description and in the attached drawings.

According to a first aspect, there is provided a grinding head for a floor grinding machine for grinding floor surfaces of stone or stone-like material, the grinding head comprising: a lower casing member, comprising a lower support and an upwardly extending edge portion, and an upper casing member, comprising an upper cover and a downwardly extending edge portion, wherein the upper casing member is joinable to the lower casing member by causing axially distal portions of the edge portions to bear on each other.

As such a grinding head casing may be composed of only two members, manufacturing and assembly thereof is facilitated. Service and disassembly is also facilitated.

Stone or stone-like materials may have a Knoop hardness of more than 130, preferably more than 135 or 140, and may thus comprise stone or stone-like materials, such as limestone, sandstone, marble, slate, granite, concrete or terrazzo.

The upper cover and the downwardly extending edge portion may be formed in one piece.

For example, the grinding head casing members may be formed by casting of a metallic material, typically iron or aluminium, or an alloy based on either thereof.

The lower support and the upwardly extending edge portion may be formed in one piece.

The upwardly and downwardly extending edge portions may extend over a height corresponding to about 25-75% of a total height of the grinding head. Preferably, the heights of the edge portions may be on the order of 60-40%, 55-45% or about 50-50%.

The distal portion of the edge portion of one of the casing members may comprise an axial support surface and a radially outwardly facing radial support surface, and the distal portion of the edge portion of the other casing member comprises an axial support surface and a radially inwardly facing radial support surface, such that when the casing members are in a joined state, the axial support surfaces abut each other and the inwardly facing radial support surfaces are positioned radially outside the outwardly facing radial support surfaces.

Hence, the axial support surfaces may extend about the entire circumference of the casing members, and be generally annular in shape. The axial support surfaces define the axial final position of the casing members when being joined.

The other casing member may comprise an inwardly inclined bevel, for radially guiding the casing member when joining the casing members.

The bevel may provide a generally conical surface, which acts as a guide when joining together the casing members.

One of the casing members may comprise at least one guide protrusion, extending axially from an axially outermost part of its edge portion, and wherein the other casing member may comprise a recess sized, positioned and adapted for receiving the guide protrusion.

The guide protrusion or protrusions may be positioned such that there is only one relative angular orientation at which the casing members may be joined. Moreover, the guide protrusion may, but need not, provide an initial point of engagement between the casing members.

According to a second aspect, there is provided a grinding head for a floor grinding machine for grinding floor surfaces of stone or stone-like material, the grinding head comprising: a lower casing member, comprising a lower support and an upwardly extending edge portion, and an upper casing member, comprising an upper cover and a downwardly extending edge portion, a first axle, extending between the upper and lower casing members, and a second axle, extending between the upper and lower casing members, wherein the axles are initially arranged in one of the casing members, such that, when the grinding head is assembled through a relative axial movement of the upper and lower casing members towards each other, the axles will engage the other one of the casing members at different relative axial positions of the casing members.

The grinding head of this second aspect provides for simplified assembly of the grinding head, both in connection with manufacture and service.

When the casing members are completely axially joined, the axles may be axially fixedly connected to said one of the casing members, and axially moveable relative to the other one of the casing members.

The upper and lower casing members may present a respective first axle seat and a respective second axle seat, and wherein a distance between the first axle seats may differ from a distance between the second axle seats.

The terms "axle seat" should be understood to include any seat for components that extend between the casing members, including, but not limited to, axles, belt tensioners and belt deflectors.

Alternatively, or as a supplement, an axial distance between a radial seat guides associated with the first axle may be different from an axial distance between radial seat guides associated with the second axle.

In particular, an effective axial distance may differ, meaning that the difference may be between the portions of the seat which provide the final intended radial position of the respective axle. Hence, guide bevels of the respective seats may be of different length.

In particular, a distance between initial points of engagement of the axle seats may differ.

A length of the first axle may differ from a length of the second axle. According to a third aspect, there is provided a grinding head for a floor grinding machine for grinding floor surfaces of stone or stone-like material, the grinding head comprising: a hollow grinding head casing enclosing: a drive axle, at least two belt pulleys associated with a respective grinding disk, a belt running over said belt pulleys and said drive axle, a belt tensioner, comprising a tensioner pulley, which is displaceable by rotation about a setting axis, which is spaced from the tensioner pulley by a pulley lever, the setting axis being parallel with an axis of rotation of the grinding head, and a tensioner setting device, for setting a position of the pulley in said direction by application of a torque about the setting axis, wherein the tensioner setting device is accessible from outside of the grinding head casing, such that the belt tensioner can be adjusted while the grinding head is in an assembled state.

By providing a belt tensioner that is accessible from the outside, it is possible to facilitate initial setup, as well as subsequent service, of the grinding head.

This third aspect can be combined by the other aspects described herein.

The grinding head may further comprise a locking device, for locking the belt tensioner relative to the grinding head, wherein said locking device may be also accessible from the outside of the grinding head casing.

The locking device may comprise a locking lever, which may be fixedly connected to an axle about which the belt tensioner may be rotatable, and a locking fastener, arranged to releasably fasten the locking lever relative to the casing, such that rotation about the setting axis is prevented.

A torque connector may be provided coaxially with the setting axis, said torque connector being permanently exposed on an outside of the grinding head casing.

The tensioner setting device may be accessible through an opening in a casing member and a sealing device may be arranged between the connector and an edge of the opening.

The grinding head may further comprise a lower casing member, and an upper casing member.

According to a fourth aspect, there is provided a grinding head for a floor grinding machine for grinding floor surfaces of stone or stone-like material, the grinding head comprising: a lower casing member, comprising a lower support, an upper casing member, comprising an upper cover, a first belt pulley, arranged on an axle extending substantially parallel with an axis of rotation of the grinding head, and a second belt pulley, spaced from the first belt pulley in a direction perpendicular to the axis of rotation of the grinding head, and partially overlapping the first belt pulley, its associated axle and/or its associated bearing, as seen in a plane parallel with the lower support, wherein the second belt pulley comprises an edge recess, which is sized and adapted such that when the edge recess is arranged with its opening towards the axis of rotation of the first belt pulley, its associated axle and/or its associated bearing is free from said overlap.

The edge recess makes it easier to assemble and disassemble the grinding head, both in connection with manufacture and in connection with service of components of the machine.

"Substantially parallel" should be understood as being parallel +/−20°, preferably +/−10° or +/−5°.

The edge recess may extend over a central angle of the second belt pulley corresponding to less than 30°, preferably less than 20° or less than 10°. Typically, the edge recess may extend over more than 5° or more than 7°.

The grinding head may further comprise an edge portion insert, which may be connectable to the second belt pulley at the edge recess, such that peripheral shape of the second belt pulley may be restored.

According to a fifth aspect, there is provided a grinding head for a floor grinding machine, comprising: a grinding head casing enclosing a transmission mechanism for transferring power an ingoing axle to cause the grinding head to rotate, wherein the transmission mechanism comprises at least one belt pulley, and at least one belt, wherein the belt pulley presents a releasably attachable edge portion, which extends over more than 50°, preferably more than 70° or more than 80° central angle of the belt pulley, and which, when released, is movable relative to the remainder of the belt pulley, such that a circumference of the belt pulley is reducible, and wherein the belt is resiliently flexible, such that its length is extended by 2.0-10%, preferably 2.0-5%, 2.2-10% or 2.2-5%. when in a mounted state as compared to a relaxed state. Typically, the edge portion may extend over less than 120°, less than 100°.

Hence, the belt may be of a kind which is designed to provide a predetermined force at a predetermined expanded length.

The releasably attachable edge portion makes it easier to assemble and disassemble the grinding head, both in connection with manufacture and in connection with service of the belt.

This aspect is particularly useful for belt pulleys providing secondary rotation, i.e. belt sheaves which are fixedly connected to the machine frame.

The edge portion may be slidable towards a centre of the belt pulley.

Alternatively, the edge portion may be entirely removable from the belt pulley.

The belt pulley may be fixedly attachable to the grinding head casing.

The transmission mechanism in which the belt is operable may contain only pulleys which are fixed relative to each other.

Hence, there is no belt tensioner operating on this belt.

The grinding head may be a planetary type grinding head, which may be rotatable relative to a machine frame, and may carry a plurality of grinding discs, each of which being rotatable relative to the grinding head.

A floor grinding machine may comprise: a machine frame, a motor, supported by the machine frame, a grinding head as claimed defined herein, supported by the machine frame and operatively connected to the motor, such that the grinding head may be rotatably drivable by the motor.

It is understood that the motor can be electric motor or a combustion engine (such as for petrol, gas, diesel or other fuel).

According to a sixth aspect, there is provided a method of assembling a grinding head for a floor grinding machine, comprising: providing a first grinding head casing member comprising a support, arranging at least two axles relative to the support, providing a second grinding head casing member comprising a cover, assembling the casing members through a relative axial movement of the casing members towards each other, characterised by causing the axles to engage the second grinding head casing member at different relative axial positions of the casing members.

According to a seventh aspect, there is provided a method of setting a belt tensioner in a grinding head for a floor grinding machine for grinding floor surfaces of stone or stone-like material, comprising: setting a position of a pulley of the belt tensioner, which pulley is enclosed in a hollow grinding head casing and displaceable in a direction perpendicular to an axis of rotation of the grinding head, in said direction, without opening the grinding head casing.

The method may further comprise: releasing a locking device, such that the belt tensioner becomes displaceable, carrying out said setting step, and engaging the locking device, so as to prevent displacement of the belt tensioner, wherein said releasing and said engaging steps are carried out without opening the grinding head casing.

In the method, setting a position may comprise applying a predetermined torque.

For example, a torque wrench or other type of torque measuring or torque indicating lever device may be used and connected to the torque connector.

According to a eighth aspect, there is provided a method of servicing, assembling or disassembling a first belt pulley of a grinding head for a floor grinding machine for grinding floor surfaces of stone or stone-like material, comprising: opening a grinding head casing of the grinding head, bringing an edge recess of a second belt pulley, which partially overlaps the first belt pulley, an axle and/or a seat associated with the first belt pulley, into alignment with a rotational axis of the first belt pulley, such that the first belt pulley, its axle and/or its seat is free from said overlap.

According to a ninth aspect, there is provided a method of attaching or releasing a belt housed in a grinding head of a floor grinding machine, comprising: releasing a releasably attachable edge portion of a belt pulley, which edge portion extends over more than 30°, preferably more than 45° or more than 60° central angle of the belt pulley, moving the releasably attachable edge portion relative to the grinding head such that a circumference of the belt pulley is reduced, applying or removing the belt, as the case may be, putting the releasably attachable edge portion back, and attaching the releasably attachable edge portion.

The belt pulley may be rotated such that the releasably attachable edge portion may face another belt pulley, which the belt runs over, subsequently releasing and moving or sliding the releasably attachable edge portion out of contact with the belt, rotating the belt pulley relative the grinding head, such that parts of the belt pulley which surround the releasably attachable edge portion contact the belt, and removing the belt.

The belt pulley may be rotated, such that parts of the belt pulley which surround the releasably attachable edge portion may be in a position where they would contact the belt, releasing and moving or sliding the releasably attachable edge portion out of contact with the belt, arranging the belt over the pulley and over at least one other belt pulley, rotating the belt pulley relative the grinding head, such that the releasably attachable edge portion faces the other belt pulley, and subsequently putting the releasably attachable edge portion back.

DETAILED DESCRIPTION

Figure 1:
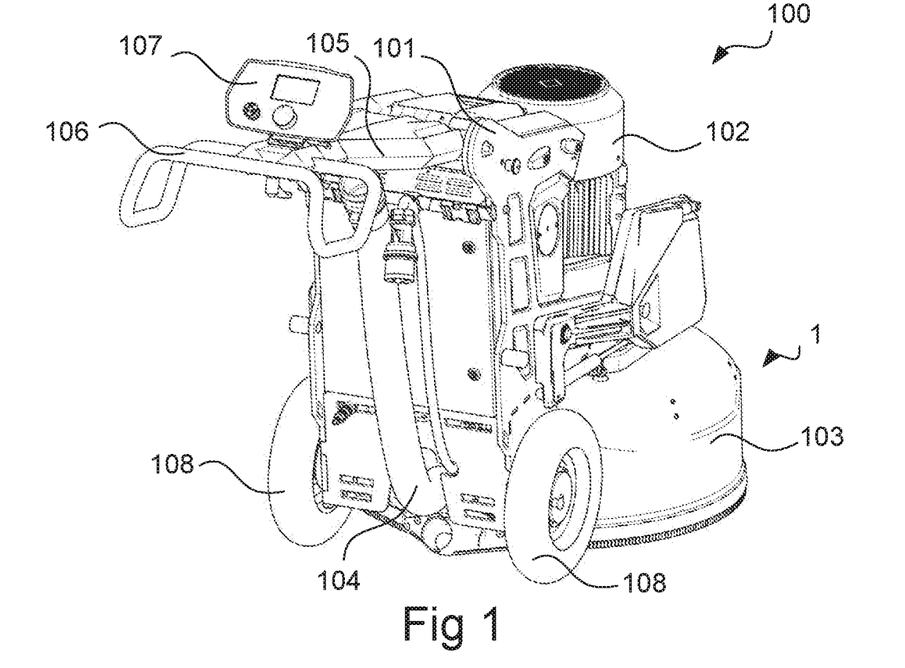
FIG. 1 is a schematic perspective view from behind of a floor grinding machine, in which the concepts according to the present disclosure may be applied.

FIG. 1 schematically illustrates a floor grinding machine 100. The grinding machine 100 comprises a machine frame 101 which supports a grinding head 1 and a motor 102. The grinding head 1 is driven by the motor 102 to rotate.

The grinding head 1 as illustrated herein is formed as a planetary type grinding head, i.e. the grinding head casing is rotatable relative to the machine frame 101, and in turn carries two or more grinding disks, each of which being rotatable relative to the casing.

The grinding head 1 may comprise a casing, which is rotatable inside a hood 103. The casing may enclose the transmission mechanism for achieving the above mentioned rotational movements.

The hood 103 may be arranged to enclose the grinding head 1, such that grinding residues are contained and can be readily collected by e.g. a collection device as will be further described.

The machine 100 may thus further comprise a collection device for collecting grinding residues, such as dust, water and the like. The collection device may comprise a hood connector, such that a space enclosed by the hood is in fluid connection with a dust collector, and optionally a channel, such as a hose or a pipe 104. A hose 104 leading to the dust collector, such as a vacuum cleaner, may be directly connectable to the hood connector, or to the channel.

The machine 100 may further comprise a handle frame 105 extending from an upper rear portion of the machine frame 101. The handle frame 105 may support a handle 106 for a user to grip and/or steer the machine 100, and optionally a user interface 107.

The user interface 107 may comprise an output device, such as a display, which may be a touch screen, for displaying information. The user interface may further comprise one or more input devices, such as a touch screen, buttons, knobs and/or a keyboard for the user to control the machine 100.

The machine 100 may be supported by wheels, such as by a pair of coaxial wheels 108. The wheels may provide part of the support, with additional, or even most, support provided by the grinding head 1.

The wheels may be freely rotatable, whereby the machine 100 may be propelled entirely by being pushed and/or pulled by the user.

As another option, the wheels may be driven by one or more motors. For example, the wheels may be individually drivable, whereby steering of the machine 100 by e.g. radio control may be enabled.

The machine 100 may comprise a control unit, which contains functionality for controlling the machine 100 and/ or feeding back information, such as setting a speed of the rotating discs, and reporting a temperature of the grinding discs.

Figure 2A:
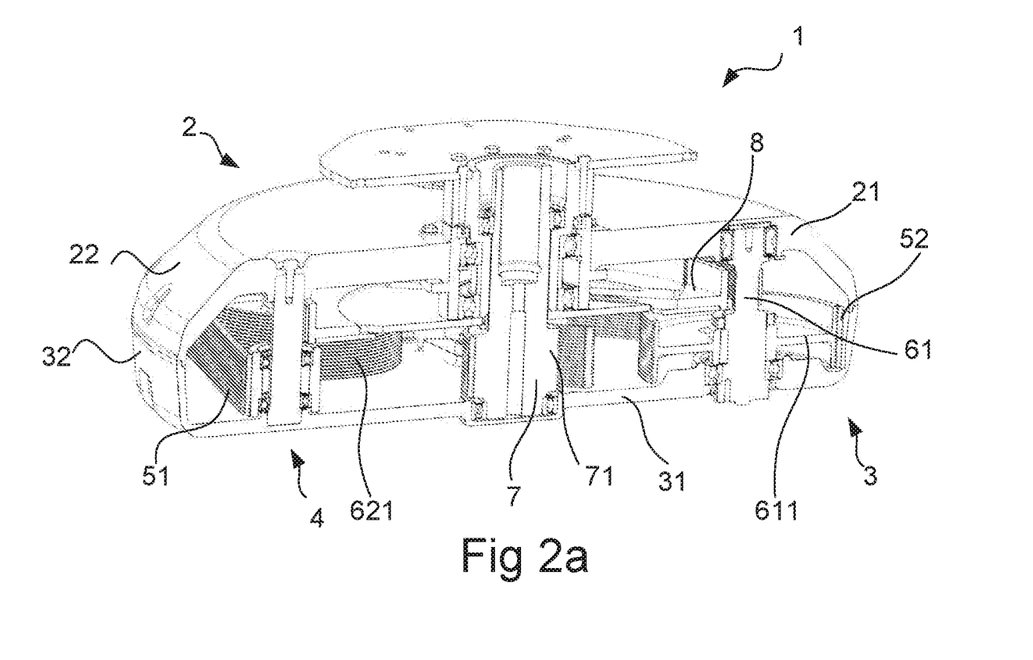
FIG. 2a is a schematic cross sectional perspective view of a grinding head.

FIG. 2a schematically illustrates a grinding head 1. The grinding head 1 comprises a casing formed by a lower casing member 3, comprising a lower support 31, which may be substantially planar, and an upwardly extending edge portion 32, which may form an edge rim of the lower casing member.

The grinding head may further comprise an upper casing member 2, comprising an upper cover 21, which may be substantially planar, and a downwardly extending edge portion 22, which may form an edge rim of the lower casing member.

The lower support 31 and the upwardly extending edge portion 32 may be integrated with each other. For example, they may be formed in one piece, such as by casting. Suitable materials may be iron, aluminium, or alloys based on iron or aluminium. Alternatively, the lower support 31 and the upwardly extending edge portion 32 may be integrated with each other by e.g. welding or other permanent fixation.

Similarly, the upper cover 21 and the downwardly extending edge portion 22 may be integrated with each other. They may be formed in one piece, by e.g. casting.

The axially distal portions of the edge portions 22, 32 are joined together forming a hollow grinding head casing.

Figure 2B:
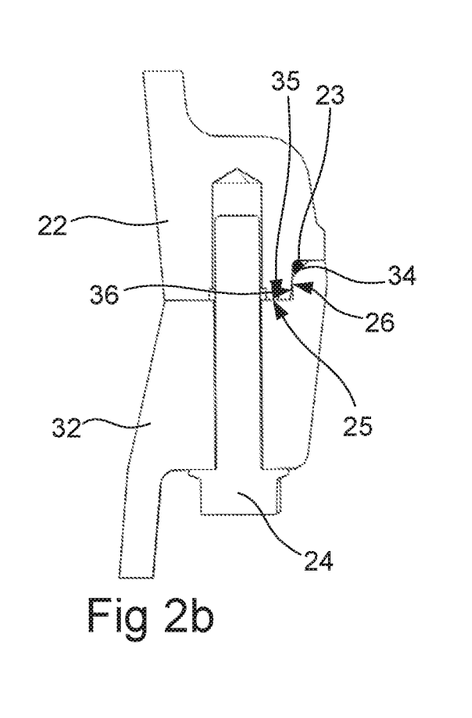
FIG. 2b is a schematic cross sectional view of joined portions of grinding head casing members.

Referring to FIG. 2b, there may be provided a seal 23 between the distal portions of the edge portions 22, 32. The seal 23 may be provided in the form of a strip of flexible or resilient material, such as rubber, or by means of setting sealing compound, such as silicone. Combinations are also possible. FIG. 2b also illustrates a way of interconnecting the casing members 2, 3, by means of a bolt 24, which is inserted into a hole in one of the casing members to engage a thread in the other one of the casing members 2, 3.

Alternatively, the fastener may comprise a bolt/nut connection, a rivet, a screw and/or a clamp. Alternatively, the joined portion may be permanently fastened by e.g. welding.

As is illustrated in FIG. 2b, distal parts of the edge portions 22, 32 may present respective axial support surfaces 25, 35, which typically provide planar surfaces that abut each other when the casing members 2, 3 are in a joined state. The axial support surfaces 25, 35 may be continuous surfaces with e.g. annular shape.

Moreover, there may be provided radial support surfaces 26, 36, including an radially outwardly facing radial support surface 26 arranged on one of the casing members 3 and a radially inwardly facing radial support surface 36 arranged on the other one of the casing members 2.

There may also be provided at least one bevel 34 on one or both of the edge portions. Such bevel may include an obliquely inwardly facing bevel 34 arranged on one of the casing members 3 and/or an obliquely outwardly facing bevel arranged on the other one of the casing members 2.

These bevels may function as initially guiding surfaces, which may facilitate the axial joining of the casing members 2, 3.

Figure 2C:
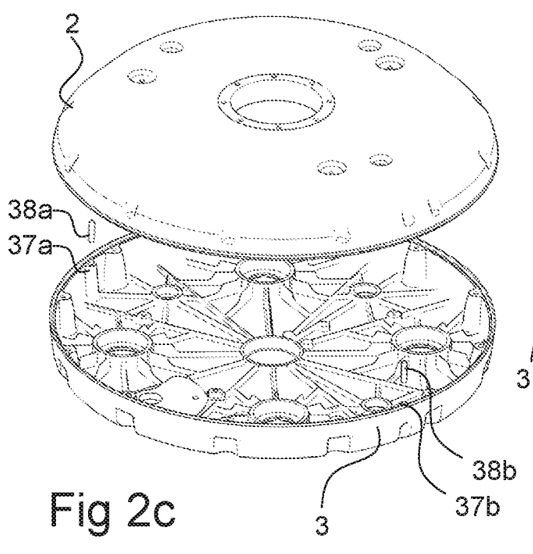
FIGS. 2c-2d are schematic perspective views of grinding head casing members.
Figure 2D:
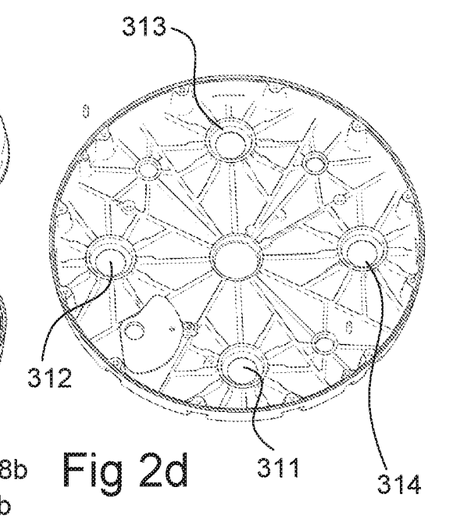
Figure 3A:
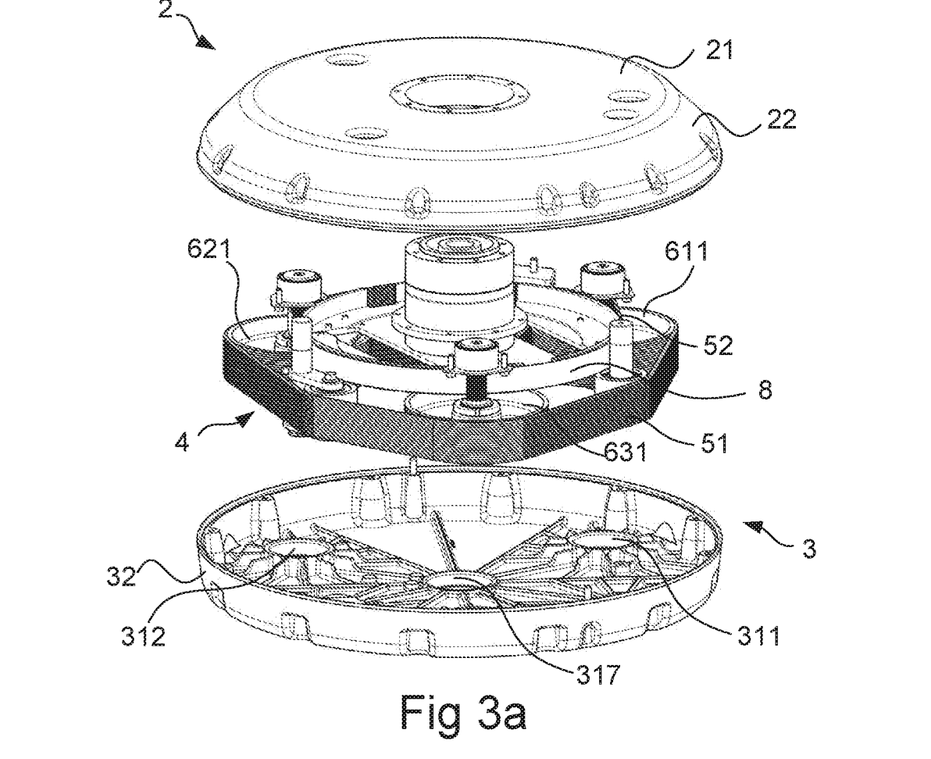
FIGS. 3a-3b are schematic views, exploded and cross sectional top view, respectively, of a grinding head having three grinding disks.
Figure 3B:
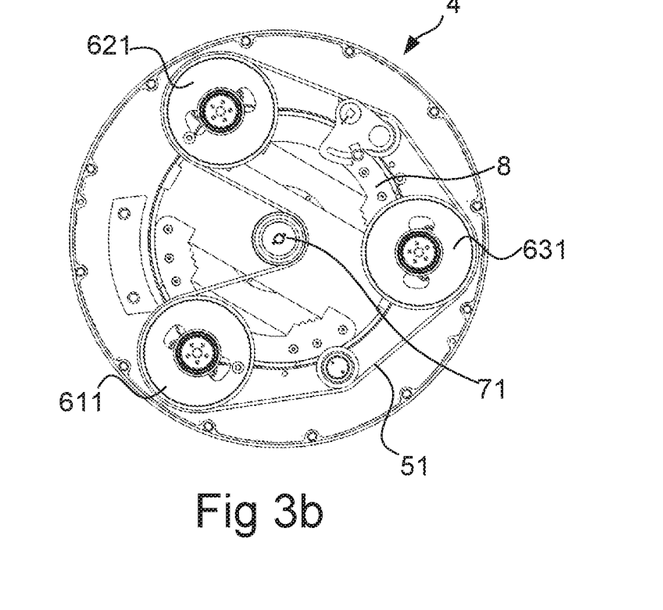
Figure 4A:
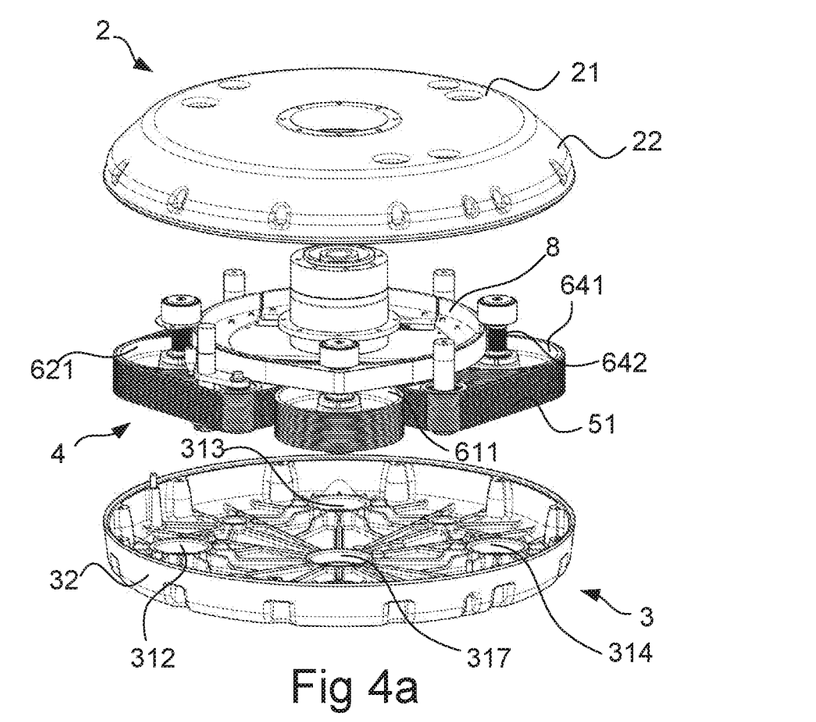
FIGS. 4a-4b are schematic views, exploded and cross sectional top view, respectively, of a grinding head having four grinding disks.
Figure 4B:
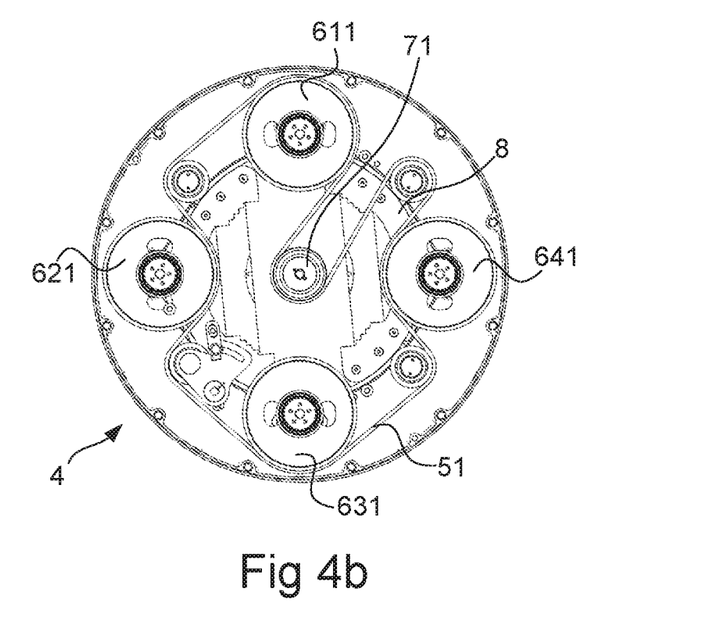

Referring to FIGS. 2c and 2d, there is illustrated how guide pins 38a, 38b and guide recesses 37a, 37b may be used to ensure correct relative angular alignment of the casing members 2, 3.

The casing encloses a transmission mechanism for causing the grinding head 1 to rotate relative to the machine frame 101, as well as for causing the grinding disks to rotate relative to the grinding head casing 2, 3.

The transmission may comprise a central axle 7, adapted to be connected to the motor 102 and provided with a central belt sheave or belt pulley 71, grinding disc axles 61, 62, 63, 64 associated with a respective grinding disk and each being provided with a respective belt sheave or belt pulley 611, 621, 631, 641. The transmission may further comprise a first belt 51, running over the central belt pulley 71 and over the belt pulleys 611, 621, 631, 641.

In addition, the first belt 51 may run over one or more deflection pulleys, as deemed necessary.

With the axles 7, 61, 62, 63, 64 and the first belt 51 providing for the transmission of rotary movement from the motor 102 to the disk axles 61, 62, 63, 64 to cause the grinding disks to rotate relative to the grinding head casing 2, 3, a secondary transmission may be provided for achieving the rotation of the grinding head 1 relative to the machine frame 101.

This secondary transmission may comprise a secondary belt pulley 612, 632 provided on one or more of the axles 61, 62, 63, 64 and a grinding head belt pulley 8, which is fixed relative to the machine frame 101.

FIGS. 3*a*-3*b* and 4*a*-4*b* respectively illustrate a grinding head 1 comprising three and four grinding disks.

The casing members 2, 3, may comprise respective seats for receiving the components forming the transmission mechanism. For example, the casing members 2, 3, may comprise seats for axles, bearings or other mounting devices.

In particular, the lower casing member 3 of the grinding head 1 may comprise seats 311, 312, 313, 314, 317 for the axles 61-64 and 7 (axles not shown in FIGS. 3*a*-3*b* and 4*a*-4*b*).

The seats may be formed as recesses or inwardly protruding rims (which may be continuous as illustrated, or intermittent, e.g. crenellated) providing an axial support surface and surrounding supports, such as the surrounding rims shown in FIGS. 3*a*-3*b* and 4*a*-4*b*. Further reinforcements of the seats may be provided. For example, ridges extending radially from the respective seat may be provided.

The belt 51 may extend between the central axle 71, the grinding disk pulleys 611, 621, 631, 641 and a belt tensioner pulley 41.

As mentioned, the transmission mechanism may further comprise a grinding head pulley 8, i.e. a pulley that is fixedly connected to the machine frame 101, and a second belt 52, arranged to transfer torque from one of the grinding disk axles to the grinding head pulley 8, thus causing the grinding head 1 to rotate relative to the machine frame 101.

Figure 5A:
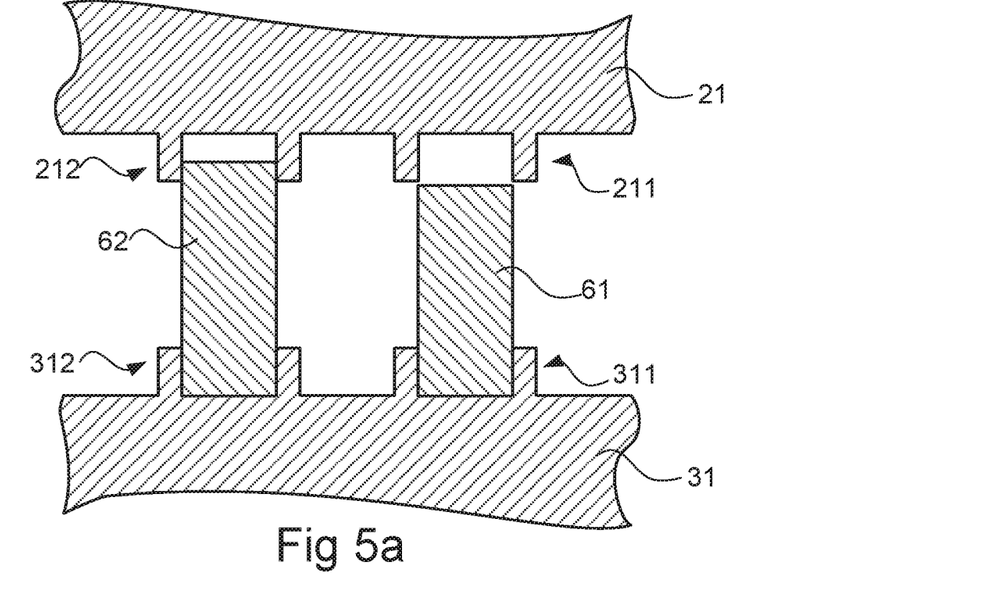
FIGS. 5a-5b schematically illustrate a process of two axles engaging with a respective seat.
Figure 5B:
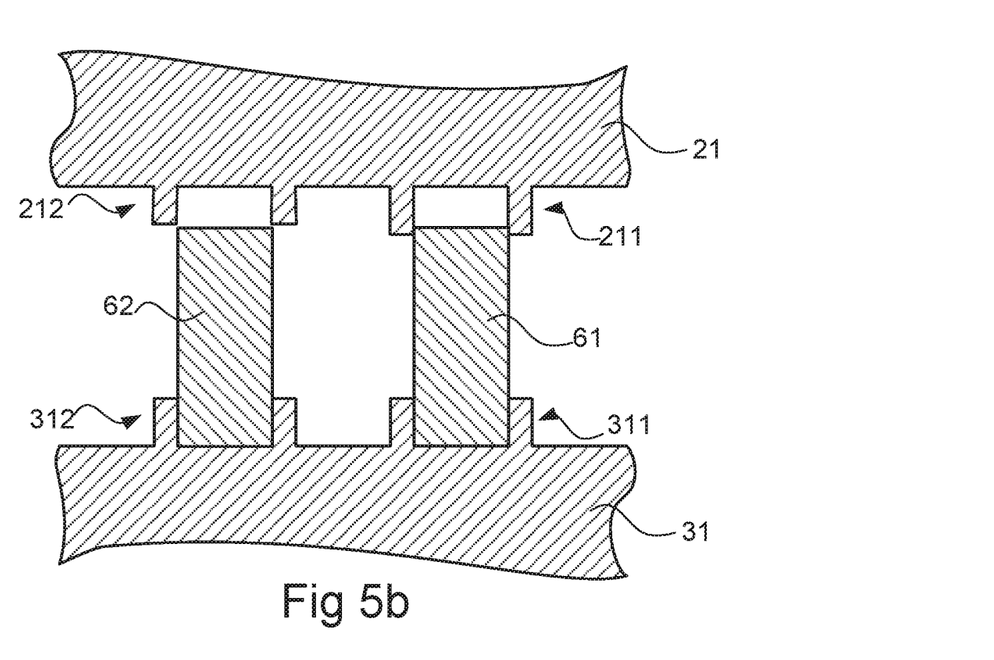

The grinding head 1 may comprise at least two axles 61, 62, extending between the upper and lower casing members 2, 3, as illustrated in FIGS. 5*a*-5*b*.

The process of assembling the casing members 2, 3, will be described with reference to FIGS. 5*a*-5*b*.

One respective end of the axles 61, 62, may be initially arranged in one of the casing members 2, 3. Typically, most of the transmission mechanism is initially mounted in the upper casing member 2, after which the lower casing member 3 is brought into place and connected to the upper casing member 2.

This initial mounting may include mounting the components in an axially fixed manner relative to this upper casing member 2.

In FIGS. 5*a*-5*b*, one end of each of the axles 61, 62, may be initially arranged in the lower casing member 3. The ends may be fixed introduced into seats 211, 212, in the upper casing member 2. This connection may be provided with a small radial play, with zero radial play or even with a slight negative play. Alternatively, one end of the axle 61 may be initially fixed in the upper casing member 2 and one end of the axle 62 may be fixed in the lower casing member 3.

The axles 61, 62, may be arranged in a seat of the casing member 2, 3. The seat may be a recess formed in the casing member, such as in the lower support 31 and in the upper cover 21, as described above.

Alternatively, the seats may be formed by a respective guide or rim extending upwardly from the lower support 31 and/or the upper cover 21 so as to surround the axle 61, 62. The guide may present a shape corresponding to an outer shape of the part that is to be received in it, as seen in a plane parallel with the lower support 31.

When the grinding head 1 is assembled through a relative axial movement of the upper and lower casing members 2, 3, towards each other, the respective other end of the axles 61, 62, may engage the other one of the casing members 2, 3 at different relative axial positions of the casing members 2, 3.

As illustrated in FIGS. 5*a*-5*b*, the upper and lower casing members 2, 3 may present a respective first axle seat 211, 311, and a respective second axle seat 212, 312. In the illustrated example, both axles 61, 62, are initially arranged in the seats 311 and 312 of the lower casing member 3.

The axles 61, 62, may engage the other casing member at different relative axial positions of the casing members 2, 3. That is, in FIG. 5*a*, axle 62 will engage the upper casing member 2 before axle 61 engages the upper casing member 2.

To this end, a length of the first axle 61 may differ from a length of the second axle 62, as illustrated in FIG. 5*a*. A length difference may be on the order of 0.5-15 mm, preferably 1-5 mm.

As another option, or supplement, a distance between the first axle seats 211, 311, may differ from a distance between the second axle seats 212, 312. Also here, the difference in distance may be on the order of 0.5-15 mm, preferably 1-5 mm.

Alternatively, the seats 211, 311, 212, 312, may have different depths, or different rim heights, as illustrated in FIG. 5*b*. The difference in depth or rim height may be on the order of 0.5-15 mm, preferably 1-5 mm. Once received in the lower casing member 3, the axles, bearings or other parts contacting the lower casing member 3 may be axially moveable relative to the lower casing member. Hence, heat expansion may be compensated for. Radially, however, the axle, bearing or other part may be fixed with zero or even negative play.

Figure 6A:
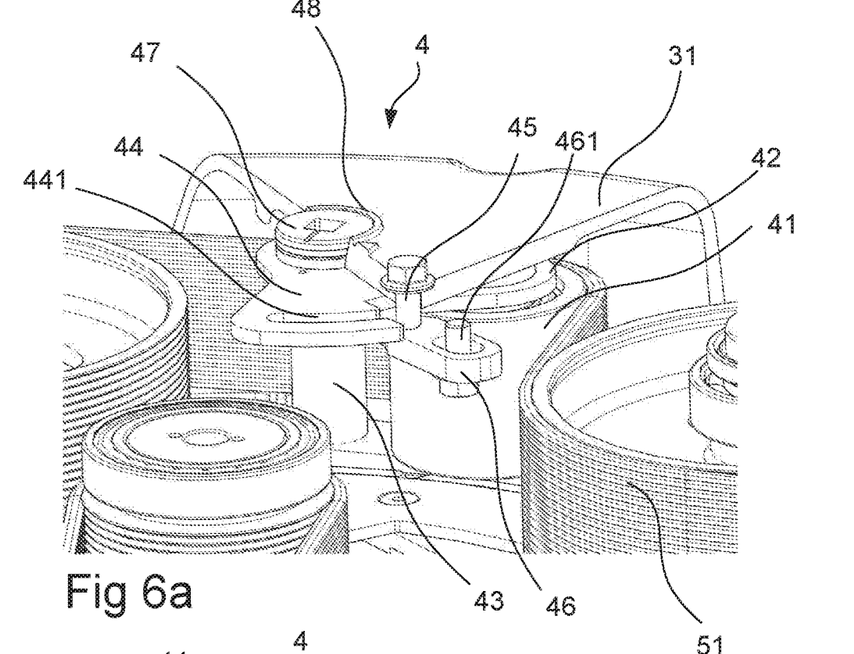
FIGS. 6a-6c are schematic perspective views of a belt tensioner, a tensioner setting device and a locking device.
Figures 6B, 6C:
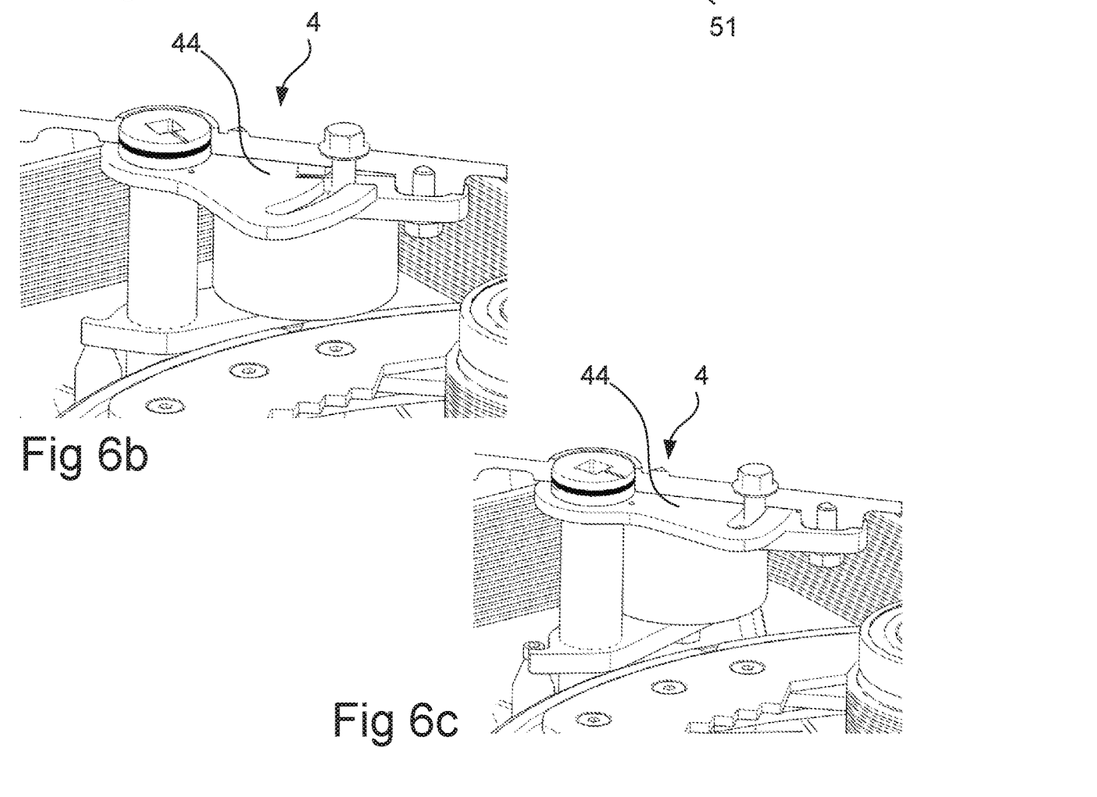

Referring to FIGS. 6*a*-6*c*, a belt tensioner 4 will be described.

FIG. 6*a* schematically illustrates a portion of a grinding head 1, with most of the lower casing member 3 cut away to reveal the interior of the grinding head 1.

The belt tensioner 4 comprises a pulley 41, which is arranged to engage the first belt 51.

A rotational axis of the pulley is displaceable in a plane perpendicular to the rotational axis of the grinding head 1. In the illustrated example, the pulley 41 is arranged on one or more pulley levers 42 extending from a setting axle 43, about which the rotational axis and the pulley 41 are pivotable.

The setting axle 43 is accessible through an opening 48 in the casing member 3.

Hence, the pulley 41 is displaceable by rotation about the setting axle 43.

A locking device 44, 45, 46, for locking the pulley 41 at an angular position about the setting axle 43 is provided. The locking device 44, 45, 46, may comprise a locking lever 44, which is fixedly connected to the setting axle 43 and a fastener 45 that is arranged to act on the locking lever 44 to prevent the locking lever 44, and thus also the pulley lever 42 from rotating about the setting axle 43.

The locking lever 44 may be integrated with, such as e.g. formed in one piece with, the pulley lever 42. For example, these two components may be formed from a single planar piece of material.

The lever fastener 45 may comprise a bolt and a device 46 providing an anvil, which through a threaded connection may engage the bolt, such that when the bolt is rotated relative to the anvil, the anvil will clamp the locking lever towards the inside of the casing member 3.

The anvil device 46 may be initially connected to the casing member 3 before assembly of the casing members 2, 3. In particular, such connection may provide some play, at least in a direction parallel with the lower support 31.

The locking lever 44 may comprise a slit 441, which may be curved with a bending radius corresponding to a radial distance from the setting axle 43 to the slit 441. The slit 441 may be open at a short end thereof, so as to facilitate assembly.

FIGS. 6a and 6b illustrate the tensioner 4 in an assembly position. The tensioner 4 may be handled as follows during the assembly.

As mentioned above, assembly of the grinding head 1 may be performed by initially mounting most components in one of the casing members 2, 3, typically the upper casing member 2, and then, as one of the last steps, mounting the other one (normally the lower casing member 3) of the casing members 2, 3.

Hence, in the illustrated example, the setting axle 43 and the levers 42, 44 are initially mounted in the upper casing member 3 (which here is turned upside down for allowing assembly).

The anvil device 46 is mounted on the inside of the lower casing member 3 and attached by means of an anvil fastener 461, which may be a screw or bolt. The anvil device 46 may be loosely fastened, i.e. there may be some play in a plane perpendicular to the axle 43.

The lever 44 is in a mounting position, which may correspond to an angular position at which the anvil device 46 and the lever 44 may pass each other, as seen in the axial direction.

The lower casing member 3 is then aligned with the upper casing member 2 and moved axially into engagement with the upper casing member 2.

Once engagement between the casing members 2, 3 has been achieved, and optionally these have been connected to each other, as described above, the lever fastener 45 is brought into engagement with the anvil device 46.

By applying a key to the axle portion 47 exposed through the opening 48 in the lower casing member 3, the locking lever 44, and thus the pulley lever 42, may be pivoted anti-clockwise (as seen in FIGS. 6b-6c), such that the shaft of the lever fastener 45 enters the lever slit 441. The pivoting motion may continue in the anti-clockwise direction until a sufficient belt tension is achieved, as illustrated in FIG. 6c, or as far as the lever slit 441 allows.

A sealing device, such as an o-ring, may be provided between the axle portion 47 and the opening 48, such that dust and debris is prevented from entering the casing 2, 3.

Preferably, the key applied comprises a torque measuring, indicating or limiting device, such that a predetermined torque may be applied to the setting axle 43.

When the desired angular position has been reached, the lever fastener 45 is further engaged, e.g. tightened, such that the lever 44 is clamped between the anvil device 46 and the lower casing 3.

Figure 7A:
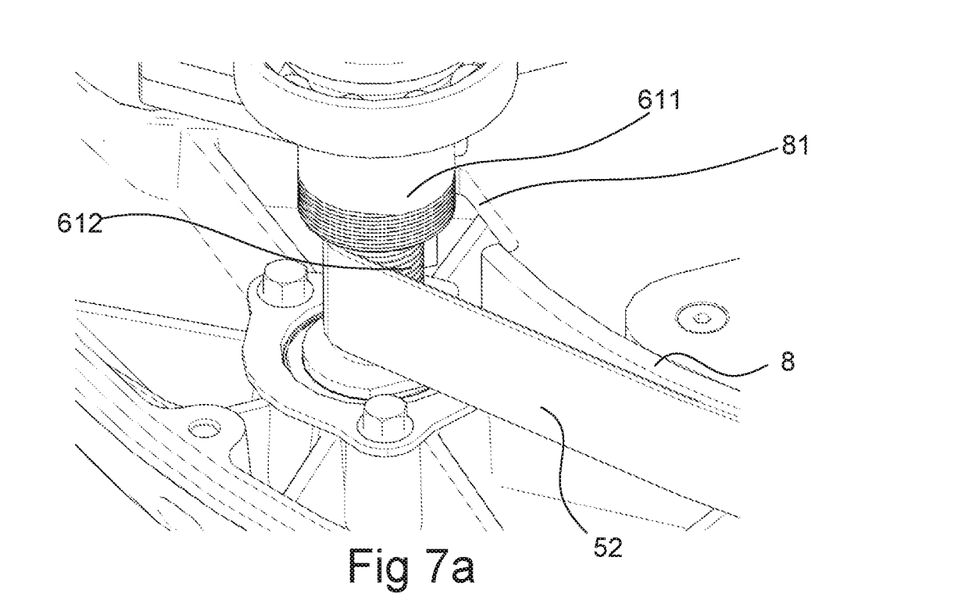
FIGS. 7a-7c are schematic perspective views of an edge recess of a belt pulley.
Figure 7B:
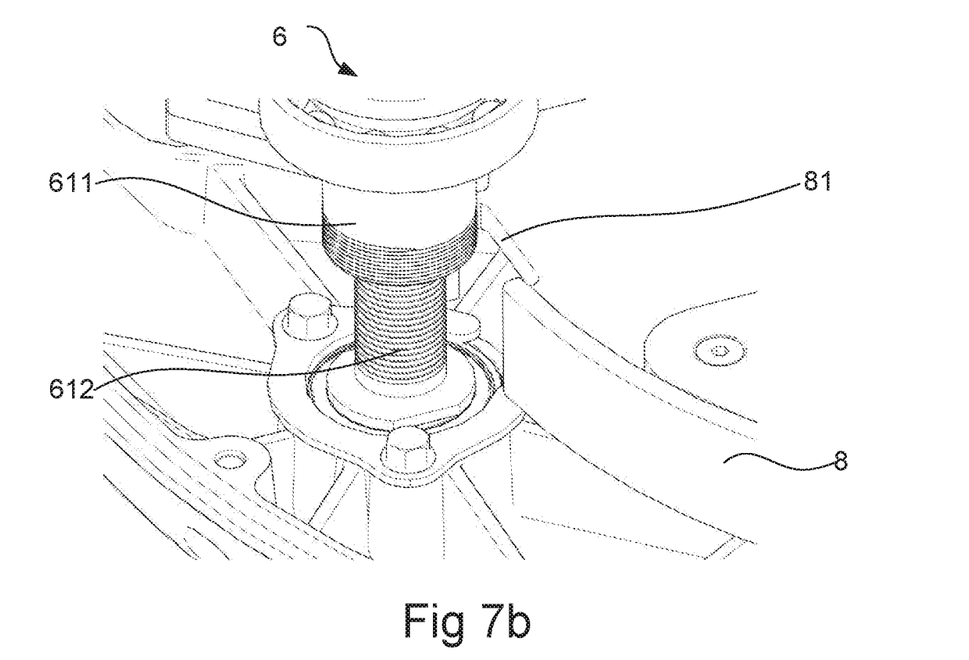
Figure 7C:
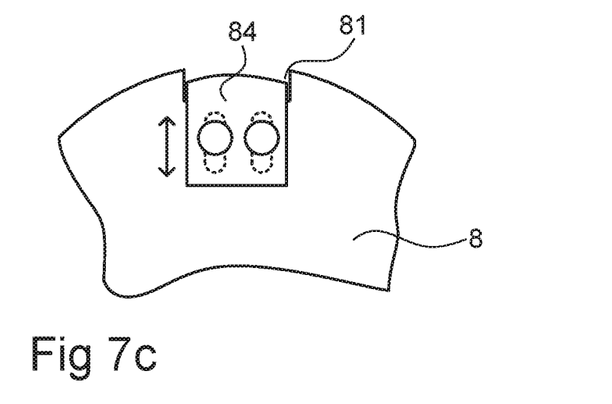

Referring to FIGS. 7a-7c, a solution for facilitating assembly and service of overlapping pulleys or other rotary components will be described.

As is recognized from e.g. FIGS. 3a-3b and 4a-4b, the grinding head pulley 8 is positioned very close to the axles 61, 62, 63, 64 carrying the belt pulleys 611, 621, 631, 641, 612, 632. Consequently, a portion of the axles 61, 62, 63, 64, or bearings associated with the belt pulleys 611, 621, 631, 641, 612, 632, may overlap with part of the grinding head pulley 8. When assembling the grinding head 1, such portions of the axles may need to be assembled before the grinding head pulley 8 is assembled. Moreover, the grinding head pulley 8 may need to be removed before the axles 61, 62, 63, 64, their associated pulleys 611, 621, 631, 641, 612, 632, or bearings, may be removed.

Hence, a periphery of the grinding head pulley may be provided with one or more edge recesses 81, i.e. recesses extending from the peripheral edge and radially inwardly to a sufficient extent, such that, when the edge recess 81 is aligned with the pulley axle 61, 62, 63, 64, the pulley axle 61, 62, 63, 64, is free from overlap with the grinding head pulley 8, as illustrated in FIG. 7b.

The edge recesses 81 may present a radial extent of about 1-20% of a radius of the grinding head pulley 8, preferably 1-10% or 1-5%. The edge recess 81 should preferably have an extent such that it reduces the circumference of the belt pulley 8 by less than 2%, preferably by less than 1%, as compared to the case where the belt pulley 8 was perfectly circular.

Moreover, the edge recess 81 may extend over a central angle of the grinding head pulley 8 corresponding to less than 30°, preferably less than 20° or less than 10°. In preferred embodiments, the angle may be 12°+/−1° or 14°+/−1°.

Referring to FIG. 7c, it is possible to provide an edge insert 84, which may be sized and adapted to restore the outer shape of the grinding head pulley 8.

The edge insert 84 may be a removable piece, which may be removed when the edge recess 81 is needed. In the alternative, it may be movably connected to the grinding head pulley 8, e.g. as illustrated in FIG. 7c, with an edge insert having a slidable connection to the grinding head pulley 8. Such a slidable connection may be provided by interaction of a bolt with one or more slits.

Figure 8A:
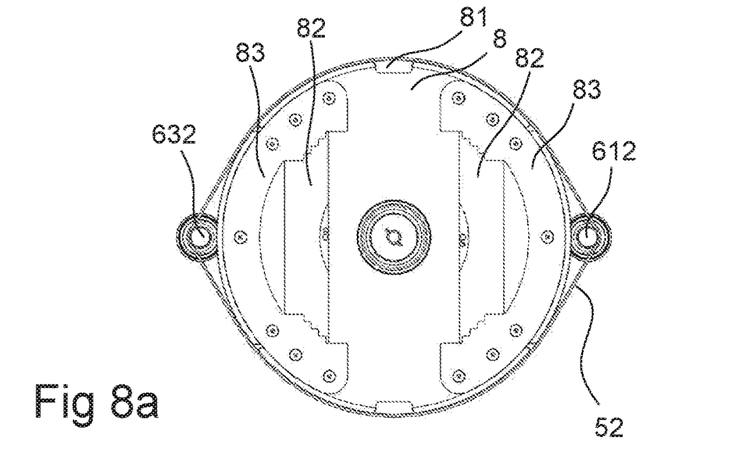
FIGS. 8a-8c schematically illustrate a device and process for mounting or releasing a belt.
Figure 8B:
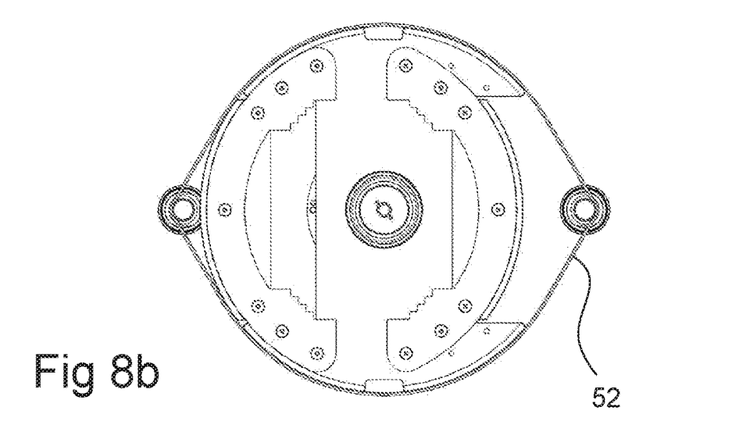
Figure 8C:
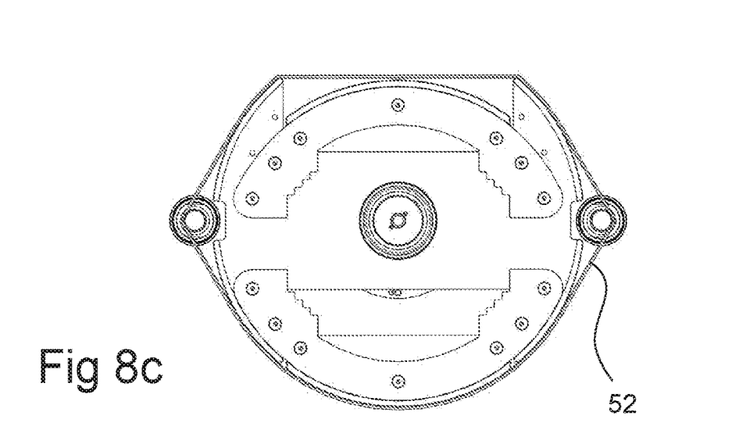

Referring to FIGS. 8a-8c, there will be described a solution for facilitating the installation of a belt 52 in a floor grinding machine 100. The solution is described with respect to a grinding head belt pulley 8, but may be applied to any other pulley.

The belt 52 may be a resilient belt, i.e. typically a belt which allows for a deformation when a force is applied to it. Typically, the deformation when the belt 52 is mounted may be on the order 2.0-10%, preferably 2.0-5%, 2.2-10% or 2.2-5%.

As can be seen in FIGS. 8a-8c, there is no need for a separate belt tensioner. The pulleys 8, 612, 632 and the slightly flexible belt 52 provide for the necessary tension of the belt 52.

In FIG. 8a, there is illustrated the arrangement for causing the grinding head 1 described above to rotate relative to the machine frame 101, as briefly mentioned above.

To this end, the grinding head pulley 8 is fixedly attached to the machine frame 101. Axles 61, 63 of a pair of the grinding disk belt pulleys 611, 631 are provided with additional belt pulleys 612, 632 for engaging a second belt 52, which thus runs around the grinding head belt pulley 8 and the two additional belt pulleys 612, 632, which are arranged to rotate in the same direction, as illustrated in FIGS. 8a-8c.

In order to facilitate assembly and disassembly of the belt 52, the grinding head belt pulley 8 may be provided with one or more edge recesses 82. The edge recesses 82 should have an extent such that a circumference of the belt pulley 8 is reduced by more than 2%, preferably by more than 5%, as compared to the case where the belt pulley 8 was perfectly circular.

The edge recesses 82 are provided with releasably attachable edge portions 83. Such edge portions 83 may be entirely removable, or merely moveable relative to the grinding head pulley body. In the example illustrated, the removably attachable edge portions 83 are slidable in a direction towards a centre of the grinding head belt pulley 8, and fixable to the grinding head belt pulley body by means of screws or bolts.

Hence, it is possible to release and move the releasably attachable edge portion 83 to facilitate removal and/or attachment of the belt 52.

The releasably attachable edge portion 83 may extend over more than 50°, preferably more than 70° or more than 80° central angle of the belt pulley 8, but preferably over less than 120°. Preferred angles may be 80°+/−2°.

At this point it is easier to remove or position the second belt 52.

After the belt 52 has been positioned (e.g. put back or replaced), the releasably attachable edge portion 83 is put back and attached.

For example, the releasably attachable edge portion 83 may facilitate removal of a belt 52, and in particular a secondary belt, according to the following method.

The belt pulley 8 is initially arranged (e.g. rotated to a position) such that the releasably attachable edge portion 83 faces one of the other belt pulleys 612, 632, which the belt 52 runs over.

At this point, the releasably attachable edge portion 83 is released and moved, e.g. by a sliding movement towards the centre of the grinding head belt pulley 8, as illustrated in FIG. 8b. It is noted, that so far, the belt 52 will still be fully in contact with the belt pulleys 612, 632, and not yet ready for being removed.

The belt grinding head belt pulley 8 may then be rotated (FIG. 8c) such that parts of the belt pulley 8 which surround the releasably attachable edge portion 83 contact the belt 52. The rotation may be about 80°-100°, preferably 90°. That is, both lateral sides of the releasably attachable edge portion 83 will contact the grinding head belt pulley body.

At this point, the effective circumference of the grinding head belt pulley 8 has been reduced, and the belt 52 may readily be removed.

It is understood that this operation may be done for one or more releasably attachable edge portions 83.

As another example, the releasably attachable edge portion 83 may facilitate mounting, putting back or replacing a belt 52.

To this end, the belt pulley 612, 632, is initially arranged (e.g. rotated) such that parts of the belt pulley which surround the releasably attachable edge portion 83 are in a position where they would contact the belt 52 (FIG. 8c).

At this point, the releasably attachable edge portion 83 may be released and moved out of contact with the belt 52. In the alternative, e.g. when initially assembling the grinding head 1, the grinding head belt pulley body may be supplied and mounted without the releasably attachable edge portion 83, and this releasably attachable edge portion 83 may then be supplied during the mounting process.

The belt 52 is then arranged over the grinding head belt pulley 8 and over at least one other belt pulley 612, 632.

The grinding head belt pulley 8 is then rotated (FIG. 8b), such that the releasably attachable edge portion 83, or the portion where it is to be mounted, faces the other belt pulley 612, 632.

At this point, the releasably attachable edge portion 83 may be moved back towards its position at the periphery, or initially supplied and thus arranged at its position at the periphery, such that a circular shape of the pulley 8 is restored.

The releasably attachable edge portion 83 is then attached to the grinding head belt pulley body, after which the assembly has been completed (FIG. 8a).

The invention claimed is:

1. A grinding head for a floor grinding machine for grinding floor surfaces of stone or stone-like material, the grinding head comprising casing members, the casing members comprising:
   a lower casing member comprising a lower support and an upwardly extending edge portion, the upwardly extending edge portion extending upward and away from the lower support around a perimeter of the lower support, and
   an upper casing member comprising an upper cover and a downwardly extending edge portion, the downwardly extending edge portion extending downwards and away from the upper cover around a perimeter of the upper cover,
   wherein the upper casing member is joinable to the lower casing member by causing the upwardly extending edge portion of the lower casing to bear on the downwardly extending edge portion such that the upwardly extending edge portion joins with the downwardly extending edge portion in a plane that is above the lower support and below the upper cover,
   wherein the upwardly extending edge portion comprises a first axial support surface and a radially outwardly facing radial support surface, and
   wherein the downwardly extending edge portion comprises a second axial support surface and a radially inwardly facing radial support surface,
   such that when the casing members are in a joined state, the first axial support surface abuts the second axial support surface and the inwardly facing radial support surface is positioned radially outside the outwardly facing radial support surface;
   wherein the upper casing comprises a first upper casing axle seat and a second upper casing axle seat;
   wherein the lower casing comprises a first lower casing axle seat and a second lower casing axle seat;
   wherein the first upper casing axle seat is aligned with the first lower casing axle seat to secure a first axle in a first axle position within the grinding head to rotate a first grinding disk about a common first axis with the first axle;
   wherein the second upper casing axle seat is aligned with the second lower casing axle seat to secure a second axle in a second axle position within the grinding head to rotate a second grinding disk about a common second axis with the second axle.

2. The grinding head as claimed in claim 1, wherein the upper cover and the downwardly extending edge portion are formed in one piece.

3. The grinding bead as claimed in claim 1, wherein the lower support and the upwardly extending edge portion are formed in one piece.

4. The grinding head as claimed in claim 1, wherein the upwardly and downwardly extending edge portions extend over a height corresponding to about 25-75% of a total height of the grinding head.

5. The grinding head as claimed in claim 1, wherein one of the upper or lower casing members comprises an inwardly inclined bevel for radially guiding the casing members when joining the upper and lower casing members.

6. The grinding head as claimed in claim 1, wherein one of the upper or lower casing members comprises at least one guide protrusion extending axially from an axially outermost part of its edge portion, and wherein the other of the upper or lower casing members comprises a recess sized, positioned, and adapted for receiving the guide protrusion.

7. A floor grinding machine comprising:
   a machine frame,
   a motor, supported by the machine frame,
   the grinding head as claimed in claim 1, supported by the machine frame and operatively connected to the motor, such that the grinding head is rotatably drivable by the motor.

8. A grinding head for a floor grinding machine for grinding floor surfaces of stone or stone-like material, the grinding head comprising:
   a lower casing member comprising a lower support and an upwardly extending edge portion, and
   an upper casing member comprising an upper cover and a downwardly extending edge portion,
   a first axle extending between the upper and lower casing members and rotatable about a first axle axis, the first axle being secured within the grinding head by a first lower casing axle seat disposed on the lower casing and a first upper casing axle seat disposed on the upper casing, the first axle being configured to rotate a first grinding disk that also rotates about the first axle axis, and
   a second axle extending between the upper and lower casing members and rotatable about a second axle axis, the second axle being secured within the grinding head by a second lower casing axle seat disposed on the lower casing and a second upper casing axle seat disposed on the upper casing, the second axle being configured to rotate a second grinding disk that also rotates about the second axle axis,
   wherein the upper cover, at the first upper casing axle seat, overlays the first axle such that no element that rotates about the first axle axis extends upward beyond the upper cover;
   wherein the upper cover, at the second upper casing axle seat, overlays the second axle such that no element that rotates about the second axle axis extends upward beyond the upper cover;
   wherein
      the first lower casing axle seat extends away from the lower support farther than the second lower casing axle seat or
      the first axle is longer than the second axle,
      such that, when the grinding head is assembled, the first axle and the second axle are initially arranged in one of the casing members and then through a relative axial movement of the upper and lower casing members towards each other, the first axle and the second axle engage the other one of the casing members at different relative axial positions of the other one of the casing members.

9. The grinding head as claimed in claim 8, wherein, when the upper casing member and the lower casing member are axially joined, the first axle and the second axle are axially fixedly connected to the upper casing member and the lower casing member, and the first axle and the second axle are axially moveable relative to the upper casing member and the lower casing member.

10. The grinding head as claimed in claim 8, wherein an axial distance between radial seat guides associated with the first axle is different from an axial distance between radial seat guides associated with the second axle.

11. The grinding head as claimed in claim 8, wherein a length of the first axle differs from a length of the second axle.

12. The grinding head of claim 8, wherein both the first axle and the second axle are driven by a belt that is entirely enclosed within the upper casing and the lower casing.

13. The grinding head of claim 8, wherein the first upper casing axle seat, first lower casing axle seat, the second upper casing axle seat, and the second lower casing axle seat each have closed bases such that no portion of a respective axle extends beyond the upper cover or the lower support.

14. The grinding head of claim 8, wherein the upper casing member and the lower casing member rotate about a central axis for the grinding head;
   wherein both the first axle and the second axle are spaced away from the central axis.

15. A method of assembling a grinding head for a floor grinding machine, comprising:
   providing a first grinding head casing member comprising a first support, a first axle seat and a second axle seat being disposed on the first support,
   arranging at least a first axle in the first axle seat and a second axle in the second axle seat, the first axle being rotatable about a first axle axis and the second axle being rotatable about a second axle axis,
   providing a second grinding head casing member comprising a second support, a third axle seat and a fourth axle seat being disposed on the second support, and
   assembling the first grinding head casing member with the second grinding head casing member through a relative axial movement of the second grinding head casing member towards first grinding casing member such that the first axle is secured within the grinding head by the first axle seat and the third axle seat and the second axle is secured within the grinding head by the second axle seat and the fourth axle seat,
   wherein the assembling comprises causing the first axle to engage the third axle seat of second grinding head casing member at a different relative axial position than the second axle engaging the fourth axle seat due to:
      the third axle seat extending farther from an internal surface of the second support of the second grinding head casing member than the fourth axle seat, or
      the first axle being longer than the second axle;
   wherein the first axle is configured to rotate a first grinding disk that rotates about the first axle axis with the first axle and the second axle is configured to rotate a second grinding disk that rotates about the second axle axis with the second axle;
   wherein, when assembled, the first axle seat of the first support overlays the first axle such that no element that rotates about the first axle axis extends upward beyond the first support;

wherein, when assembled, the second axle seat of the first support overlays the second axle such that no element that rotates about the second axle axis extends upward beyond the first support.

* * * * *

UNITED STATES PATENT AND TRADEMARK OFFICE
CERTIFICATE OF CORRECTION

PATENT NO. : 12,048,982 B2
APPLICATION NO. : 16/305997
DATED : July 30, 2024
INVENTOR(S) : Andreas Fogelberg et al.

It is certified that error appears in the above-identified patent and that said Letters Patent is hereby corrected as shown below:

In the Claims

In Column 15, Claim 3, Line 1, "The grinding bead" should read --The grinding head--

Signed and Sealed this
Tenth Day of December, 2024

Katherine Kelly Vidal
*Director of the United States Patent and Trademark Office*